W. M. McCAFFERTY.
PLOW.
APPLICATION FILED MAY 12, 1917.

1,239,281.

Patented Sept. 4, 1917.
2 SHEETS—SHEET 1.

Inventor
WALTER M. McCAFFERTY

By Watson E. Coleman
Attorney

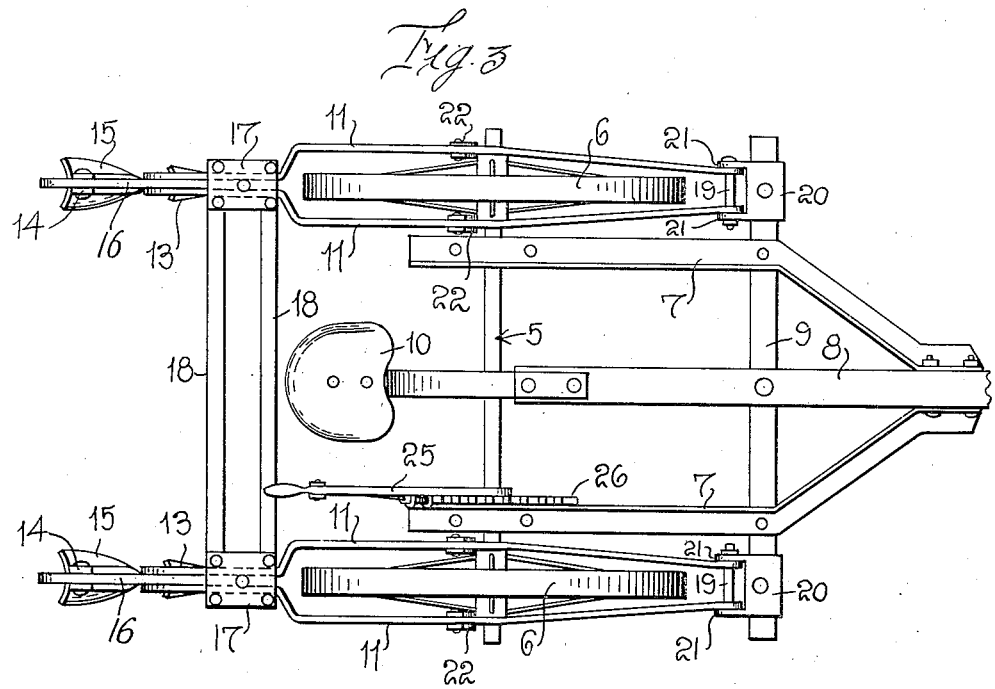

UNITED STATES PATENT OFFICE.

WALTER MENDON McCAFFERTY, OF MONTROSE, COLORADO.

PLOW.

1,239,281. Specification of Letters Patent. Patented Sept. 4, 1917.

Application filed May 12, 1917. Serial No. 168,176.

*To all whom it may concern:*

Be it known that I, WALTER M. MCCAF-FERTY, a citizen of the United States, residing at Montrose, in the county of Montrose and State of Colorado, have invented certain new and useful Improvements in Plows, of which the following is a specification, reference being had to the accompanying drawings.

This invention relates to an improved plow and more particularly to a wheeled gang plow of the character disclosed in Patent No. 682,733, granted to H. M. McCafferty, on September 17, 1901.

It is the primary object of the present invention to improve and simplify the mounting and arrangement of the beams which carry the plows and to provide an improved means for lowering or raising the plow beams with respect to the wheel axle so as to dispose the plows for penetration into the ground at the desired depth or elevate the plows to an inoperative position.

It is a more particular object of the invention to provide plow beams pivotally mounted at their forward ends and straddling the respective ground wheels, cam elements fixed upon the wheel axle and bearing upon the under sides of the beams, and manually operable means for rocking the axle with respect to the wheels, whereby the beams may be raised by the cams and supported thereby at the desired elevation.

It is a further general object to provide improvements in the patented machine as above characterized, which will greatly increase the serviceability and utility of the machine as a whole, though without adding to any material extent to the manufacturing cost thereof.

With the above and other objects in view, my invention consists in the novel features of construction, combination, and arrangement of parts to be hereinafter more fully described, claimed, and illustrated in the accompanying drawing, in which, Figure 1 is a side elevation of a wheeled gang plow illustrating the preferred embodiment of my invention;

Fig. 3 is a top plan view;

Fig. 4 is an enlarged sectional view taken on the line 4—4 of Fig. 1; and

Fig. 5 is a fragmentary perspective view illustrating the pivotal mounting of the forward ends of the plow beams.

Figure 1:
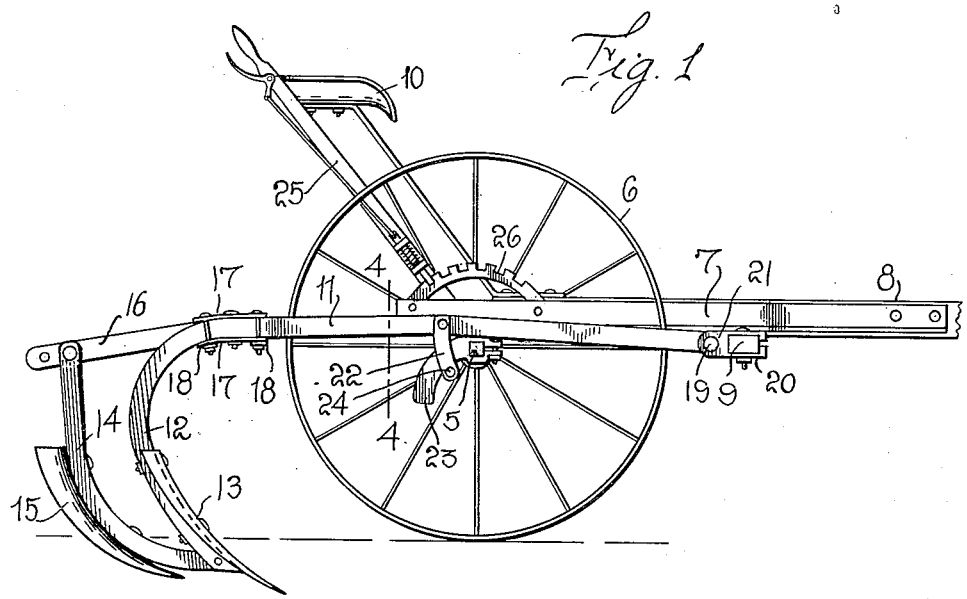

Referring in detail to the drawing, 5 designates the wheel axle which is of square or rectangular frame, and upon this axle, in spaced relation to its opposite ends, the ground wheels 6 are revolubly mounted. Spaced angle bars 7 are rigidly secured at their rear ends upon said axle and have their forward end portions convergently extended and bolted or otherwise suitably secured to opposite sides of the tongue or pole 8. These angle bars are also secured upon a transversely disposed bar 9 which is disposed in advance of the wheels 6 and is securely fixed to the under side of the draft pole 8. Upon the rear end of the draft pole, the driver's seat indicated at 10, is suitably mounted.

Each of the plow beams 11 includes spaced, parallel bars which straddle the respective ground wheels 6 and extend over the wheel axle 5. Rearwardly of the wheels 6, the spaced bars are convergently disposed and downwardly curved to provide standards 12 upon which the plow shovels 13 are suitably secured. A rearwardly curved and upwardly extending shovel bar 14 is pivotally connected to the lower end of each standard 12, and upon said bar a second plow shovel 15 is mounted. To the upper end of each bar 14, the rear end of a bar 16 is adjustably connected, the forward end of said bar being disposed between the spaced bars of the beam 11 and securely held in place between the plates 17 which are securely clamped upon the upper and lower sides of the beam 11. These clamping devices are connected by the spaced metal bars 18.

The beams 11 extend at an angle in a downward direction both forwardly and rearwardly of the axle 5 and the forward ends of the spaced bars constituting each beam are pivotally mounted upon a bolt 19 which is engaged in spaced ears 21 formed upon a split, rectangular sleeve or collar 20 which is securely bolted to the transverse bar or beam 9.

Upon the bars of each beam 11, at opposite sides of the ground wheels 6, the stirrup plates 22 are securely bolted, and between the spaced arms of these plates which project downwardly below the beams, a rearwardly extending, curved cam lever 23 which is fixed upon the square axle 5, is disposed. The ends of the stirrup plates 22 are connected by the bolt 24 which extends beneath the lower edge of the cam 23. Upon the axle 5, the lower end of the manually operable lever 25 is rigidly secured, said lever carrying the usual spring-pressed latch dog for engagement with the teeth of a rack 26 which is fixed upon one of the angle bars 7.

Figure 2:
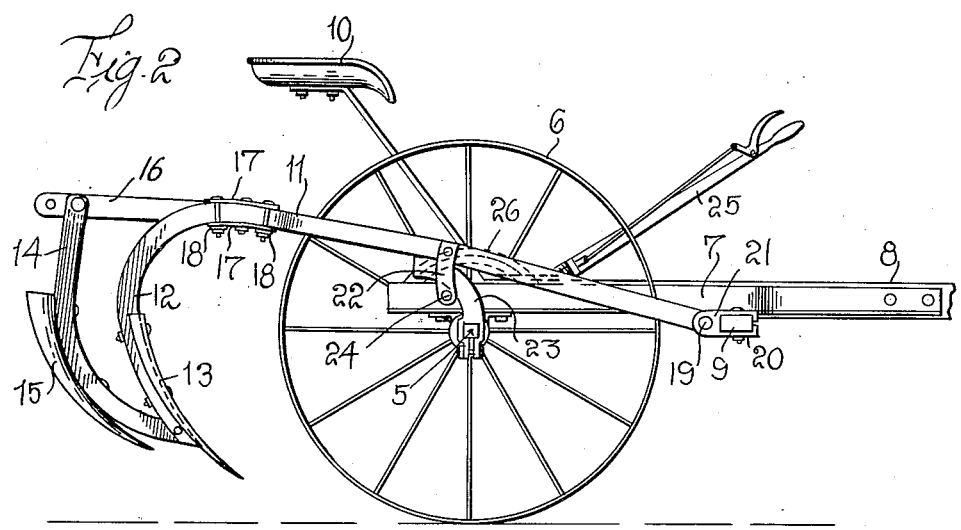
Fig. 2 is a similar view showing the plows raised or elevated to an inoperative position.

From the foregoing description, taken in connection with the accompanying drawing, the construction, manner of operation, and several advantages of my improved plow will be clearly and fully understood. By the proper manipulation of the lever 25, the shaft 5 is rocked or turned with respect to the ground wheels, thereby raising or lowering the beams 11 through the medium of the cams 23 which are engaged with the lower edges of the bars constituting each beam. Thus, the plows 13 and 15 may be properly positioned so that they will enter the soil to the desired depth. It will be understood, of course, that the rear plow shovels 15 will operate to widen the furrow formed by the plow 13, and through the loosened soil to the opposite sides thereof. When the lever 25 is moved to the position seen in Fig. 2, the cams 23 act to raise the beams 11 so as to dispose the plows in an elevated inoperative position. It will be appreciated that by means of the present invention, the beams and the plows carried thereby may be adjusted with much less manual labor than was required in the operation of the patented machine heretofore referred to. It is also to be observed that the plows are directly in line with the ground wheels, and as the beams straddle the wheels, said beams are held against lateral shifting movement while the stirrup plates 23 also operate to prevent any possibility of the displacement of the beams out of vertical alinement with the cam levers 23. The device as a whole is of relatively simple construction, and the present improvements do not add materially to the manufacturing cost of the original machine. In practice, the present improved construction has given highly satisfactory results.

While I have herein shown and described the preferred construction and arrangement of the several elements employed, it is to be understood that the same are susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:

1. In a plow, the combination of a supporting axle and ground wheels revolubly mounted thereon, a transverse beam fixedly connected to the axle in advance of the ground wheels, plow beams extending over the axle and pivotally connected at their forward ends to said first named beam, plows mounted on the rear ends of the latter beams, cams fixed upon the wheel axle and co-acting with the lower edges of the respective beams, depending guides rigidly fixed to the respective beams in which the cams are operatively engaged, and manually operable means for rocking the axle to raise or lower said beams.

2. In a plow, an axle and spaced wheels revolubly mounted thereon, a transverse beam in advance of said wheels, a frame connecting said beam to the axle, beams straddling the respective wheels and pivotally connected at their forward ends to said first named beam, plows mounted upon the rear ends of said plow beam, spaced cam levers fixed upon the axle and co-acting with each of the beams, stirrup plates rigidly secured upon each beam between which the respective cam levers are disposed, and manually operable means to rock said axle and raise or lower the plow beams.

In testimony whereof I hereunto affix my signature in the presence of two witnesses.

WALTER MENDON McCAFFERTY.

Witnesses:
   JNO. D. ROBUCK,
   CLARENCE W. GREGORY.